United States Patent
Konrad et al.

(10) Patent No.: US 12,437,869 B2
(45) Date of Patent: Oct. 7, 2025

(54) HEADSET INTEGRATED INTO HEALTHCARE PLATFORM

(71) Applicant: Sesame AI, Inc., San Francisco, CA (US)

(72) Inventors: Robert Konrad, San Francisco, CA (US); Kevin Boyle, San Francisco, CA (US); Nitish Padmanaban, Menlo Park, CA (US); Gordon Wetzstein, Palo Alto, CA (US)

(73) Assignee: Sesame AI, Inc., San Francisco, CA (US)

( * ) Notice: Subject to any disclaimer, the term of this patent is extended or adjusted under 35 U.S.C. 154(b) by 230 days.

(21) Appl. No.: 17/580,566

(22) Filed: Jan. 20, 2022

(65) Prior Publication Data

US 2022/0238220 A1    Jul. 28, 2022

Related U.S. Application Data

(60) Provisional application No. 63/140,701, filed on Jan. 22, 2021, provisional application No. 63/153,176, (Continued)

(51) Int. Cl.
*G16H 40/67*    (2018.01)
*G02B 27/00*    (2006.01)
(Continued)

(52) U.S. Cl.
CPC ......... *G16H 40/67* (2018.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 7,558,622 B2 * 7/2009 Tran ............... A61B 5/1117
                                              600/509
10,228,565 B1 * 3/2019 Saarikko ............ H04N 9/3129
(Continued)

FOREIGN PATENT DOCUMENTS

RU          2724442 C1    6/2020
WO    WO 2020/224041 A1  11/2020

OTHER PUBLICATIONS

Li et. al., Computer Vision for Brain Disorders Based Primarily on Ocular Responses, Apr. 20, 2021, Front. Neurol., vol. 12—2021 (Year: 2021).*

(Continued)

*Primary Examiner* — Anne-Marie K Alderson
(74) *Attorney, Agent, or Firm* — Fenwick & West LLP

(57) ABSTRACT

Embodiments are related to a headset integrated into a healthcare platform. The headset comprises one or more sensors embedded into a frame of the headset, a controller coupled to the one or more sensors, and a transceiver coupled to the controller. The one or more sensors capture health information data for a user wearing the headset. The controller pre-processes at least a portion of the captured health information data to generate a pre-processed portion of the health information data. The transceiver communicates the health information data and the pre-processed portion of health information data to an intermediate device communicatively coupled to the headset. The intermediate device processes at least one of the health information data and the pre-processed portion of health information data to generate processed health information data for a health-related diagnostic of the user.

20 Claims, 7 Drawing Sheets

Related U.S. Application Data filed on Feb. 24, 2021, provisional application No. 63/173,742, filed on Apr. 12, 2021.

(51) Int. Cl.
*G02B 27/01* (2006.01)
*G16H 10/60* (2018.01)
*G16H 50/20* (2018.01)

(52) U.S. Cl.
CPC .............. *G16H 10/60* (2018.01); *G16H 50/20* (2018.01); *G02B 2027/0138* (2013.01); *G02B 2027/0178* (2013.01)

(56) References Cited

U.S. PATENT DOCUMENTS

| | | | |
|---|---|---|---|
| 10,395,111 B2 | 8/2019 | Konttori et al. | |
| 10,437,327 B2* | 10/2019 | Sengelaub | G06V 40/193 |
| 10,474,229 B1* | 11/2019 | Gollier | G02B 27/141 |
| 10,610,111 B1 | 4/2020 | Tran | A61B 5/296 |
| 10,638,938 B1* | 5/2020 | Tzvieli | A61B 5/748 |
| 11,217,033 B1* | 1/2022 | Morgan | G16H 40/67 |
| 11,269,406 B1 | 3/2022 | Sztuk et al. | |
| 11,617,559 B2* | 4/2023 | Samec | G16H 50/30 |
| | | | 345/633 |
| 2001/0043163 A1 | 11/2001 | Waldern et al. | |
| 2005/0182654 A1* | 8/2005 | Abolfathi | G16H 30/20 |
| | | | 705/2 |
| 2005/0203366 A1* | 9/2005 | Donoghue | A61B 5/6814 |
| | | | 607/46 |
| 2008/0246629 A1* | 10/2008 | Tsui | H02J 50/001 |
| | | | 340/870.07 |
| 2011/0288379 A1 | 11/2011 | Wu | |
| 2012/0019529 A1 | 1/2012 | Kimpe | |
| 2012/0116772 A1* | 5/2012 | Jones | G16H 40/67 |
| | | | 704/E11.001 |
| 2012/0330109 A1* | 12/2012 | Tran | A61B 5/14532 |
| | | | 600/509 |
| 2013/0013331 A1* | 1/2013 | Horseman | A61B 5/0022 |
| | | | 705/2 |
| 2015/0142462 A1* | 5/2015 | Vaidya | G16H 40/63 |
| | | | 705/2 |
| 2015/0278474 A1* | 10/2015 | Stueckemann | G06Q 10/10 |
| | | | 705/2 |
| 2015/0359467 A1* | 12/2015 | Tran | A61B 5/6822 |
| | | | 600/595 |
| 2016/0077585 A1 | 3/2016 | Mizuhara | |
| 2016/0195924 A1 | 7/2016 | Weber et al. | |
| 2016/0292850 A1 | 10/2016 | Perez et al. | |
| 2016/0331255 A1* | 11/2016 | Cheatham, III | A61B 5/024 |
| 2017/0007167 A1* | 1/2017 | Kostic | A61B 5/6898 |
| 2017/0039703 A1* | 2/2017 | Wang | A61B 5/4064 |
| 2017/0195637 A1* | 7/2017 | Kusens | G16H 80/00 |
| 2017/0235931 A1* | 8/2017 | Publicover | H04N 23/90 |
| 2017/0365101 A1* | 12/2017 | Samec | G06T 19/006 |
| 2018/0039386 A1 | 2/2018 | Nishiyama et al. | |
| 2018/0054568 A1 | 2/2018 | Sugawara | |
| 2019/0046037 A1* | 2/2019 | Ramesh | G16H 50/20 |
| 2019/0103143 A1* | 4/2019 | Hasbun | G11C 11/221 |
| 2019/0327567 A1 | 10/2019 | Blum et al. | |
| 2019/0354173 A1 | 11/2019 | Young et al. | |
| 2019/0354174 A1 | 11/2019 | Young et al. | |
| 2019/0370926 A1 | 12/2019 | Hagland | |
| 2020/0005026 A1* | 1/2020 | Andersen | A63F 13/428 |
| 2020/0037942 A1* | 2/2020 | Howard | A61B 5/4088 |
| 2020/0174255 A1 | 6/2020 | Hollands et al. | |
| 2020/0211555 A1* | 7/2020 | Khaleghi | G06V 40/171 |
| 2020/0350075 A1* | 11/2020 | Noch | G10L 25/66 |
| 2021/0169417 A1* | 6/2021 | Burton | A61B 5/4857 |
| 2021/0247610 A1 | 8/2021 | Bhakta et al. | |
| 2021/0341998 A1 | 11/2021 | Sun | |
| 2022/0004009 A1 | 1/2022 | Myhre et al. | |
| 2022/0005798 A1 | 1/2022 | Qi et al. | |
| 2022/0007936 A1* | 1/2022 | Yang | A61B 5/7264 |
| 2022/0011496 A1 | 1/2022 | Bhakta et al. | |
| 2022/0100269 A1 | 3/2022 | Eash et al. | |
| 2022/0238220 A1 | 7/2022 | Konrad et al. | |
| 2022/0261076 A1 | 8/2022 | Choi et al. | |
| 2024/0115202 A1* | 4/2024 | Tran | A61B 5/002 |

OTHER PUBLICATIONS

Aksit, K. et al. "Gaze-Sensing LEDs for Head Mounted Displays." arXiv Preprint arXiv:2003.08499v1, Mar. 20, 2020, pp. 1-14.

Angelopoulos, A. N. et al. "Event Based, Near Eye Gaze Tracking Beyond 10,000Hz." IEEE Transactions on Visualization and Computer Graphics, Feb. 5, 2021, pp. 1-12.

Borsato, F. H. et al. "A Fast and Accurate Eye Tracker Using Stroboscopic Differential Lighting." Proceedings of the IEEE International Conference on Computer Vision (ICCV) Workshops, Dec. 2015, pp. 110-118.

Katrychuk, D. et al. "Power-Efficient and Shift-Robust Eye-Tracking Sensor for Portable VR Headsets." Proceedings of the 11th ACM Symposium on Eye Tracking Research & Applications, Jun. 25-28, 2019, Denver, CO, USA, pp. 1-8.

Li, T. et al. "Battery-Free Eye Tracker on Glasses." Proceedings of the 24th Annual International Conference on Mobile Computing and Networking, Oct. 29-Nov. 2, 2018, New Delhi, India, pp. 67-82.

Mastrangelo, A. S. et al. "A Low-Profile Digital Eye-Tracking Oculometer for Smart Eyeglasses." 11th International Conference on Human System Interaction (HIS), Jul. 4-6, 2018, pp. 506-512.

Rigas, I. et al. "Photosensor Oculography: Survey and Parametric Analysis of Designs Using Model-Based Simulation." IEEE Transactions on Human-Machine Systems, vol. 48, No. 6, Dec. 2018, pp. 1-12.

TobiiPro. "Dark and Bright Pupil Tracking." TobiiPro.com, 2022, 5 pages, [Online] [Retrieved Apr. 25, 2022], Retrieved from the Internet <URL:https://www.tobiipro.com/learn-and-support/learn/eye-tracking-essentials/what-is-dark-and-bright-pupil-tracking/>.

Padmanaban, N. et al., "Autofocals: Evaluating gaze-contingent eyeglasses for presbyopes," Science Advances, vol. 5, Jun. 28, 2019, pp. 1-7.

Padmanaban, N., "Enabling Gaze-Contingent Accommodation in Presbyopia Correction and Near-Eye Displays," A Dissertation Submitted to the Department of Electrical Engineering and the Committee on Graduate Studies of Stanford University, May 2020, pp. 1-36.

PCT International Search Report and Written Opinion, PCT Application No. PCT/US2022/013193, Apr. 21, 2022, 16 pages.

PCT International Search Report and Written Opinion, PCT Application No. PCT/US2022/013195, Apr. 26, 2022, 14 pages.

United States Office Action, U.S. Appl. No. 17/580,568, filed Sep. 23, 2022, eight pages.

* cited by examiner

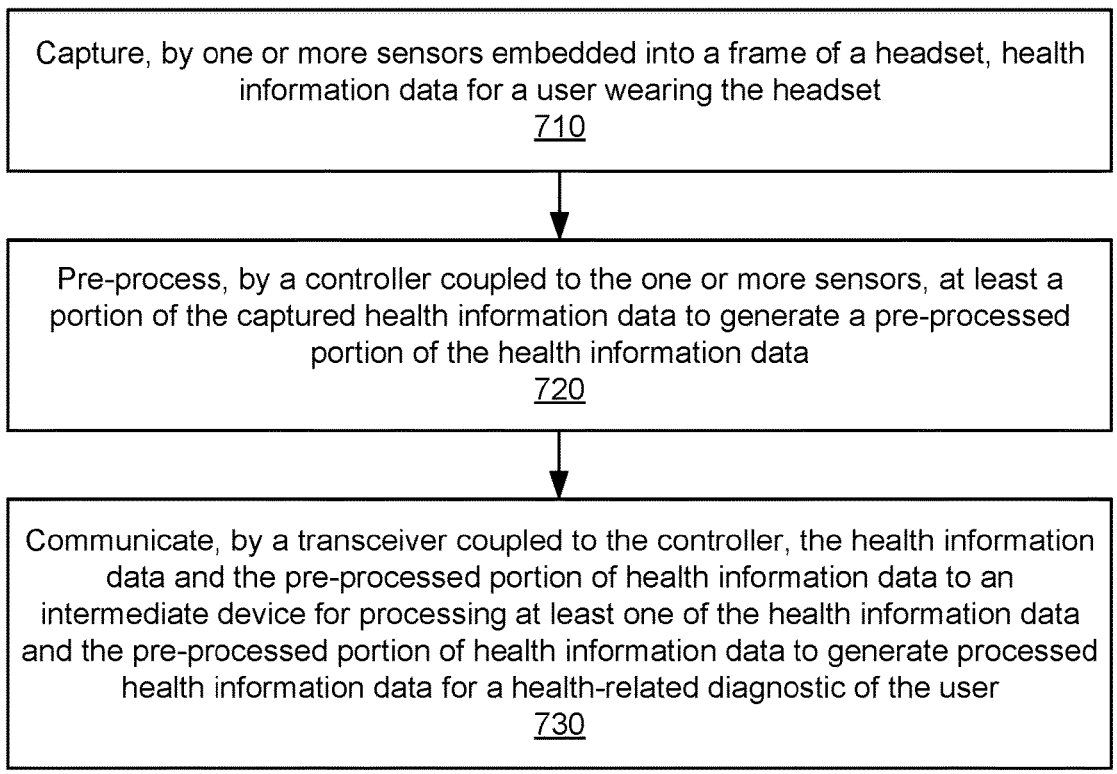

700

Capture, by one or more sensors embedded into a frame of a headset, health information data for a user wearing the headset
710

Pre-process, by a controller coupled to the one or more sensors, at least a portion of the captured health information data to generate a pre-processed portion of the health information data
720

Communicate, by a transceiver coupled to the controller, the health information data and the pre-processed portion of health information data to an intermediate device for processing at least one of the health information data and the pre-processed portion of health information data to generate processed health information data for a health-related diagnostic of the user
730

FIG. 7

HEADSET INTEGRATED INTO HEALTHCARE PLATFORM

CROSS-REFERENCE TO RELATED APPLICATIONS

This application claims a benefit and priority to U.S. Provisional Patent Application Ser. No. 63/140,701, filed on Jan. 22, 2021, U.S. Provisional Patent Application Ser. No. 63/153,176, filed on Feb. 24, 2021, and U.S. Provisional Patent Application Ser. No. 63/173,742, filed on Apr. 12, 2021, which are hereby incorporated by reference in their entirety.

FIELD OF THE INVENTION

This disclosure relates generally to a system with a headset, and more specifically to a headset integrated into a healthcare platform.

BACKGROUND

There is currently no standardized hardware for eye-based diagnostics. For example, a virtual reality gear with generic eye-tracking capability may be used for brain health diagnostics. An eye-tracking tablet can be used for, e.g., dynamic vision training. A smartphone camera can be utilized for, e.g., measuring efficacy of pain relief medication. A computer camera can be used for, e.g., cognitive health diagnostics. A generic high-resolution camera can be used for, e.g., operational risk management and/or epilepsy diagnostics. Thus, there is a need for a comprehensive healthcare platform that can be used for various healthcare applications.

SUMMARY

Embodiments of the present disclosure relate to a headset integrated into a healthcare platform. The headset comprises one or more sensors embedded into a frame of the headset, a controller coupled to the one or more sensors, and a transceiver coupled to the controller. The one or more sensors capture health information data for a user wearing the headset. The controller pre-processes at least a portion of the captured health information data to generate a pre-processed portion of the health information data. The transceiver communicates the health information data and the pre-processed portion of health information data to an intermediate device communicatively coupled to the headset. The intermediate device processes at least one of the health information data and the pre-processed portion of health information data to generate processed health information data for, e.g., a health-related diagnostic of the user.

Some embodiments of the present disclosure relate to a method for utilizing a headset for a health-related diagnostic of a user wearing the headset. The method comprises: capturing, by one or more sensors embedded into a frame of the headset, health information data for a user wearing the headset; pre-processing, by a controller coupled to the one or more sensors, at least a portion of the captured health information data to generate a pre-processed portion of the health information data; and communicating, by a transceiver coupled to the controller, the health information data and the pre-processed portion of health information data to an intermediate device for processing at least one of the health information data and the pre-processed portion of health information data to generate processed health information data for a health-related diagnostic of the user.

Some embodiments of the present disclosure further relate to a system integrated into a healthcare platform. The system comprises a headset and an intermediate device communicatively coupled to the headset. The headset includes one or more sensors embedded into a frame of the headset, a controller coupled to the one or more sensors, and a transceiver coupled to the controller. The one or more sensors capture health information data for a user wearing the headset. The controller pre-processes at least a portion of the captured health information data to generate a pre-processed portion of the health information data. The transceiver communicates the health information data and the pre-processed portion of health information data to an intermediate device communicatively coupled to the headset. The intermediate device includes another transceiver configured to receive the health information data and the pre-processed portion of health information data, and another controller configured to process at least one of the health information data and the pre-processed portion of health information data to generate processed health information data for a health-related diagnostic of the user.

BRIEF DESCRIPTION OF THE DRAWINGS

FIG. 7 is a flow chart illustrating a process for utilizing a headset for a health-related diagnostic of a user wearing the headset, in accordance with one or more embodiments.

Figure 1:
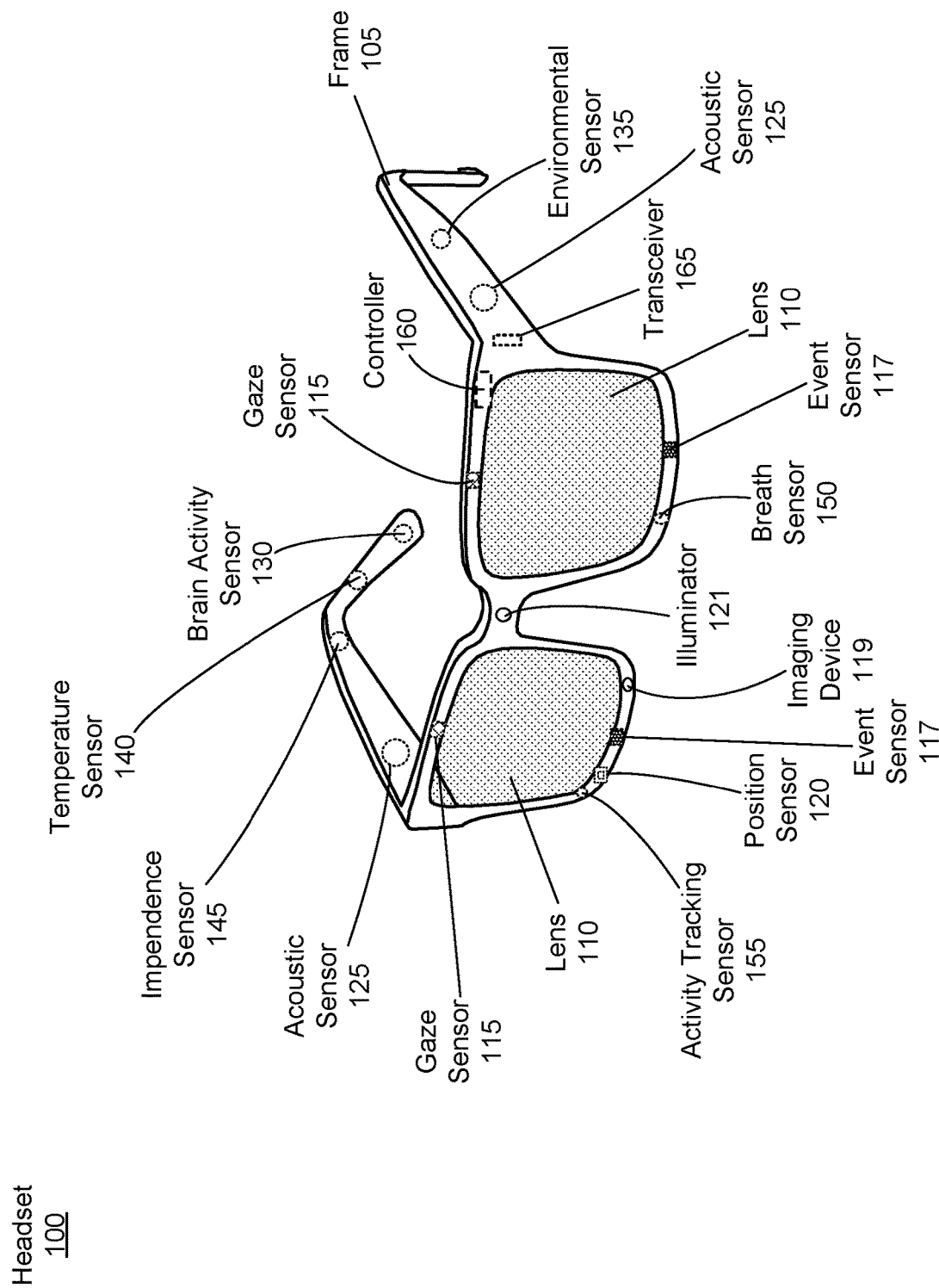
FIG. 1 is a perspective view of a headset that can be integrated into a healthcare platform, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An autofocals headset (e.g., smart electronic eyeglasses) can have various initial applications including but not limiting to, e.g., allowing a natural refocusing experience for presbyopes, playing audio, and capturing world-facing video to record events. The autofocals headset can significantly improve the visual experience of presbyopes due to the headset's automatic refocusing ability enabled by the electronics and computing power of the headset. However, the autofocals headset can also include one or more sensors that continuously and/or intermittently record user's data. The electronics components (e.g., one or more controllers coupled to one or more sensors) of the headset can be leveraged to provide information about the user that has previously been untapped by the eyewear market. By utilizing one or more cameras and other sensors in the headset, user's data can be gathered continuously and/or intermittently that can be later used for health and wellness diagnostic purposes. Thus, the autofocals headset can serve as part of a healthcare platform.

A healthcare platform that leverages user's data gathered from one or more sensors mounted on a headset is presented herein. In some embodiments, the user's data may include eye related information, e.g., eye focus information, eye tracking information, images of the eye, some other eye related information, or combination thereof. In some other embodiments, the user's data may include non-eye related information, e.g., skin temperature, skin condition information, images of food being eaten, posture information, head orientation, some other non-eye related information, or combination thereof. The headset may rank the collected user's data, and may provide the collected user's data to a paired intermediate device (e.g., smartphone, laptop, tablet, computer, etc.) based on the ranking, e.g., higher ranked user's data are sent before lower ranked items. A certain level of processing (e.g., pre-processing) of the collected user's data can also locally be performed at, e.g., a controller of the headset and then provided to the intermediate device. The intermediate device may perform (additional) processing on received user's data, and may upload the processed user's data and/or raw user's data to a server platform (e.g., cloud platform) and/or at least one third party application device for further processing and/or utilization. The server platform may interface with the at least one third party application device that leverages the raw user's data and/or processed user's data.

At least some of the gathered user's data can be critical for certain health related applications, such as early detection of Alzheimer's disease, early detection of Parkinson's disease, epilepsy treatments, stroke detection, transient ischemic attack (TIA) detection, posture monitoring, digital device hygiene, some other health related application, or combination thereof. For example, TIA typically causes a sudden curtain-like region of vision loss that usually lasts for several minutes. During this time, vision statistics (e.g., positions in the visual field to which the eyes gaze) may change from their normal baseline. The change of vision statistics caused by TIA can be detected and reported to the user or appropriate services (e.g., emergency physicians). The eye-related data used for TIA detection can be processed at the headset, the intermediate device, and/or the server platform. Signals other than the eye-related data can also facilitate classifying a TIA by detecting some other TIA symptoms. For example, a microphone mounted on the headset can determine a slurred or garbled speech by the user. Additionally or alternatively, an inertial measurement unit (IMU) integrated at the headset can determine the user's loss of balance or coordination.

The user's data captured at the headset may be communicated to the intermediate device, which can either provide diagnostics directly or send the user's information further to the server platform. The server platform can efficiently perform a large amount of computations to, e.g., extract interesting statistics and/or features from the user's data captured at the headset and expose the extracted statistics and/or the features to third parties through, e.g., an Application Processing Interface (API) of the server platform. In one or more embodiments, the third parties can access user's data streams communicated from the intermediate device to the server platform and build their own health related applications on top of the server platform's API in order to run their own diagnostics.

Embodiments of the present disclosure relate to a headset integrated into a healthcare platform for a health-related diagnostic of a user wearing the headset. The headset comprises one or more sensors and a controller coupled to the one or more sensors. The one or more sensors capture data related to a health of a user wearing the headset. The one or more sensors may include: at least one eye tracking imaging device, at least one mouth-facing camera, at least one accelerometer, at least one gyro, at least one magnetometer, at least one temperature sensor, at least one microphone, at least one brain activity sensor, at least one impedance sensor, at least one environmental sensor, one or more other sensors, or combination thereof. The controller may process at least a portion of the captured data. The headset communicates, via one or more intermediate devices of the healthcare platform, the captured data to a server platform of the healthcare platform for further processing of the captured data and utilization of the processed captured data by at least one external party or at least one user of a healthcare application running on at least one device.

FIG. 1 is a perspective view of a headset 100 that can be integrated into a healthcare platform, in accordance with one or more embodiments. In general, the headset 100 may be worn on the face of a user such that content (e.g., media content) is presented via one or more lenses 110 of the headset 100. However, the headset 100 may also be used such that media content is presented to a user in a different manner. Examples of media content presented by the headset 100 include one or more images, video, audio, or some combination thereof. The headset 100 may include, among other components, a frame 105, a pair of lenses 110, a plurality of various sensors, a depth camera assembly (DCA), a controller 160, a transceiver 165, and a power assembly (not shown in FIG. 1). While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The headset 100 may correct or enhance the vision of a user, protect the eye of a user, or provide images to a user. The headset 100 may produce artificial reality content for the user. The headset 100 may be smart electronic eyeglasses. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night. The headset 100 may be a mask or full-face respirator that filters a user's air. The headset 100 may be a welding shield or helmet to protect a user's eyes from intense light and the user's face from sparks. The headset 100 may be diving goggles that separate a user's eyes from surrounding water.

The frame 105 holds other components of the headset 100. The frame 105 includes a front part that holds the one or more lenses 110 and end pieces to attach to a head of the user. The front part of the frame 105 bridges the top of a nose of the user. The end pieces (e.g., temples) are portions of the frame 105 to which the temples of a user are attached. The length of the end piece may be adjustable (e.g., adjustable temple length) to fit different users. The end piece may also include a portion that curls behind the ear of the user (e.g., temple tip, ear piece).

The one or more lenses 110 provide light to a user wearing the headset 100. As illustrated, the headset 100 includes a lens 110 for each eye of the user. In some embodiments, each lens 110 is part of a display block (not shown in FIG. 1) that generates image light that is provided to an eye box of the headset 100. The eye box is a location in space that an eye of the user occupies while the user wears the headset 100. In this context, the headset 100 generates Virtual Reality (VR) content. In some embodiments, one or both of the lenses 110 are at least partially transparent, such that light from a local area surrounding the headset 100 may be combined with light from one or more display blocks to produce Augmented Reality (AR) and/or Mixed Reality (MR) content.

In some embodiments, the headset 100 does not generate image light, and each lens 110 transmits light from the local area to the eye box. For example, one or both of the lenses 110 may be a lens without correction (non-prescription) or a prescription lens (e.g., single vision, bifocal and trifocal, or progressive) to help correct for defects in a user's eyesight. In some embodiments, each lens 110 may be polarized and/or tinted to protect the user's eyes from the sun. In some embodiments, each lens 110 may have a light blocking feature being activated, e.g., each lens 110 may be implemented as an electrochromic lens. In some embodiments, the lens 110 may include an additional optics block (not shown in FIG. 1). The optics block may include one or more optical elements (e.g., lens, Fresnel lens, etc.) that direct light to the eye box. The optics block may, e.g., correct for aberrations in some or all of visual content presented to the user, magnify some or all of the visual content, or some combination thereof.

In some embodiments, the lens 110 operates as a varifocal optical element that change its focal distance based on a user's eye gaze, e.g., as a focus-tunable lens. The lens 110 may be implemented as a liquid lens, liquid crystal lens, or some other type of lens that is able to vary its optical power. The lens 110 may be directly coupled to the controller 160, and the controller 160 may provide appropriate varifocal instructions (e.g., pulses with various voltage levels) to at least one portion of the lens 110 in order to change at least one optical power associated with the at least one portion of the lens 110.

The DCA determines depth information for a portion of a local area surrounding the headset 100. The DCA includes one or more imaging devices 119 and a DCA controller (not shown in FIG. 1), and may also include one or more illuminators 121. In some embodiments, the illuminator 121 illuminates a portion of the local area with light. The light may be, e.g., structured light (e.g., dot pattern, bars, etc.) in the infrared (IR), IR flash for time-of-flight, etc. In some embodiments, the one or more imaging devices 119 capture images of the portion of the local area that include the light from the illuminator 121. As illustrated, FIG. 1 shows a single illuminator 121 and a single imaging device 119. In alternate embodiments, there are at least two imaging devices 119 integrated into the frame 105. The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 121), some other technique to determine depth of a scene, or some combination thereof. In some embodiments, the imaging device 119 is oriented toward a mouth of the user, and the imaging device 119 may capture mouth related information (e.g., information about food being eaten), which can be utilized for, e.g., health-related diagnostic of the user wearing the headset 100.

The headset 100 includes various sensors embedded into the frame 105 for, e.g., capturing health information data for a user wearing the headset 100. The sensors embedded into the frame 105 illustrated in FIG. 1 include at least one of: one or more gaze sensors 115, one or more event sensors 117, a position sensor 120, one or more acoustic sensors 125, a brain activity sensor 130, an environmental sensor 135, a temperature sensor 140, an impedance sensor 145, a breath sensor 150, and an activity tracking sensor 155. While FIG. 1 illustrates the sensors in example locations on the headset 100, the sensors may be located elsewhere on the headset 100. Similarly, there may be more or fewer sensors embedded into the frame 105 than what is shown in FIG. 1.

The gaze sensors 115 detect when a user is looking at each of them within a threshold distance. The gaze sensors 115 are embedded into the frame 105 and there may be different numbers of gaze sensors 115 in the frame 105 relative to FIG. 1. Each gaze sensor 115 can detect when the user gazes at or sufficiently close to that gaze sensor 115, i.e., when a gaze vector of the user is within a threshold distance from that gaze sensor 115. The gaze sensor 115 may include a light emitter and a detector (not shown in FIG. 1). The light emitter of the gaze sensor 115 may emit tracking light (e.g., IR light) to the eye of the user, and the detector of gaze sensor 115 detects a signal related to a version of the tracking light reflected from at least one surface (e.g., pupil, retina, sclera, etc.) of the eye. The tracking light may be continuous, pulsed, structured light, some other type of light, or combination thereof. By detecting the signal related to the version of tracking light reflected from the at least one surface of the eye, the gaze sensor can capture various eye-related information for the user that can be utilized for, e.g., a health-related diagnostic of the user. More details about the structure of the gaze sensor 115 and health-related applications of the gaze sensor 115 are provided in connection with FIGS. 2A-2B and FIG. 5.

The event sensor 117 may measure an amount of occlusion over time of a pupil for the user's eye. The amount of occlusion over time for the pupil captured by the event sensor 117 may be provided to the controller 160 for determining eyelid statistics, e.g., information about a PERCLOS (percentage of eyelid closure over the pupil) over time, a total blink duration, an eye closing duration, a hold duration at the "bottom" of the blink, an eye reopening duration, some other eyelid statistics, or combination thereof. The headset 100 may include a pair of event sensors 117—one event sensor 117 for each user's eye. The event sensor 117 may be implemented as an eye-tracking sensor including an illuminator and an event-sensitive imaging device (camera). In one or more embodiments, at least one of the gaze sensors 115 can be configured to operate as an event sensor, and separate event sensor(s) 117 may not be required.

The position sensor 120 generates one or more measurement signals in response to motion of the headset 100. The position sensor 120 may capture information about head orientation, head stability, user's posture, etc., which can be utilized for, e.g., a health-related diagnostic of the user. The position sensor 120 may include an IMU. Examples of position sensor 120 include: one or more accelerometers, one or more gyroscopes, one or more magnetometers, another suitable type of sensor that detects motion, a type of sensor used for error correction of the IMU, or some combination thereof. The position sensor 120 may be located external to the IMU, internal to the IMU, or some combination thereof.

The acoustic sensor 125 may monitor and capture audio information. For example, the acoustic sensor 125 may monitor and capture speech of the user. Additionally, the acoustic sensor 125 may monitor and capture ambient sounds from a local area of the headset 100. The acoustic sensor 125 may be, e.g., a microphone, a vibration sensor, an accelerometer, or any combination thereof. In some embodiments, the audio information captured by the acoustic sensor 125 may be combined with health information data captured by other sensors embedded into the frame 105 and utilized for, e.g., a health-related diagnostic of the user.

A health metric that can be determined from auditory information captured by the acoustic sensor 125 may be a presence of speech deterioration that could be classified as, e.g., aphasia, apraxia, or dysarthria. The aphasia, apraxia, and dysarthria represent language disorders commonly observed as garbled or slurred speech that may be indicators of user's neurological damage. Auditory signals captured by the acoustic sensor 125 may be input into a natural language processing algorithm (e.g., a machine learning model or deep learning model running at a controller of the headset 100 or at the intermediate device coupled with the headset 100) to determine a score that can be correlated to the presence of speech deterioration, e.g., aphasia, apraxia, or dysarthria. For example, the score above a threshold value can be classified as the user exhibiting a language disorder and can be further compared to health-related metrics determined from the eye-related data, such as different pupil dilations between the eyes or changes in "normal" gaze statistics to classify that the user may be exhibiting signs of neurological damage. Another health metric that can be determined from auditory information captured by the acoustic sensor 125 is a metric that classifies user's coughs. A frequency and type of user's coughs throughout the day may be used to diagnose various "smoker's lung" diseases and/or other chronic conditions. A frequency and type of user's sneezes can also be classified from the auditory information captured by the acoustic sensor 125. The natural language processing (e.g., implemented as a machine learning model or deep learning model) can use the captured auditory information associated with sneezes to interpret, e.g., an emotional state of the user. The audio information captured by the acoustic sensor 125 may be processed at the headset, the intermediate device, and/or the server platform.

The brain activity sensor 130 may capture information about brain activity for the user. The brain activity sensor 130 may be an electroencephalogram (EEG) based sensor mounted on the headset 100, e.g., at one or more locations including a nose bridge and/or temple ends around ears. The information about brain activity captured by the brain activity sensor 130 may be utilized (alone or in combination with other health information data captured by other sensors) for, e.g., a health-related diagnostic of the user. In one embodiment, the information about brain activity captured by the brain activity sensor 130 can be utilized for early detection of Alzheimer's disease. In another embodiment, the information about brain activity captured by the brain activity sensor 130 can be utilized for early detection of Parkinson's disease. In yet another embodiment, the information about brain activity captured by the brain activity sensor 130 can be utilized for epilepsy detection.

People with the Parkinson's disease may have persistent eye tremors that make focusing the eyes on a single object difficult. The eye tremors may be detectable (e.g., by the gaze sensor 115) well in advance of other commonly recognized symptoms of the Parkinson's disease. By detecting eye movements (e.g., by the gaze sensor 115), the eye tremors may be identified, which may facilitate detection of the Parkinson's disease at an early stage. Fixation, pro-saccade, and/or smooth pursuit eye movements (e.g., captured by the gaze sensors 115) can be used (alone or in combination with brain activity information captured by the brain activity sensor 130) to detect and identify the Alzheimer's disease. For detection of epilepsy, specifically for people exhibiting absence seizures, the detection of rapid upward eye movements (e.g., captured by the gaze sensors 115) can be used (alone or in combination with brain activity information captured by the brain activity sensor 130) to detect a seizure event. Data used for detecting the Parkinson's disease, the Alzheimer's disease and epilepsy can be processed at the headset, the intermediate device, and/or the server platform.

The environmental sensor 135 may capture environmental information for a local area of the headset 100. The environmental sensor 135 may be $CO_2$ (carbon-dioxide) based sensor, CO (carbon-monoxide) based sensor, particulate matter (PM) based sensor (e.g., PM2.5 sensor for detecting particles that are 2.5 microns or smaller in diameter), some other environmental sensor embedded into the frame 105, or combination thereof. Additionally or alternatively, the environmental sensor 135 may be used to capture environmental information related to: ambient light intensity and wavelength spectrum (e.g., for sleep-related circadian rhythm, eyesight protection, etc.), ambient noise levels (e.g., for hearing protection/monitoring), a level of $CO_2$ in a local area surrounding the environmental sensor 135 (e.g., for measuring breathing rate), an ambient temperature, etc. The environmental information captured by the environmental sensor 135 may be utilized (in combination with other health information data captured by other sensors) for, e.g., a health-related diagnostic of the user. The environmental information and environmental factors captured by the environmental sensor 135 may be correlated with other health-metrics. For example, a high PM level captured by the environmental sensor 135 may be correlated with an increased rate of user's coughing (e.g., captured by the acoustic sensor 125). The environmental information and environmental factors captured by the environmental sensor 135 can be processed at the headset, the intermediate device, and/or the server platform.

The temperature sensor 140 may capture temperature information about the user. In or more embodiments, the temperature sensor 140 may be embedded into the frame 105 so that the temperature sensor 140 is touch with the user. Alternatively, the temperature sensor 140 may be configured to capture temperature information about the user without being in contact with the user's skin, i.e., configured as a contactless temperature sensor. The temperature information captured by the temperature sensor 140 may be utilized (alone or in combination with other health information data captured by other sensors) for, e.g., a health-related diagnostic of the user.

The impedance sensor 145 may obtain health information related to the user's skin (e.g., skin conductivity, skin dryness, skin humidity, sweating information, etc.). The impedance sensor 145 can be embedded into the frame 105 such that the impedance sensor 145 is in contact with the user's skin. In one or more embodiments, impedance sensor 145 is implemented as a liquid sensor in touch with the user's skin for capturing sweating information for the user. The skin-related information captured by the impedance sensor 145 may be utilized (alone or in combination with other health information data captured by other sensors) for, e.g., a health-related diagnostic of the user. For example, hyperhidrosis (excessive sweating) or anhidrosis (lack of sweating) that may be detected by the impedance sensor 145 can be signs of diabetes. The system may determine, over an extended time period (e.g., months or years), a baseline sweat profile for the user, and shifts from the determined baseline sweat profile may be used as a potential sign of diabetes. Sweat profiles (e.g., detected by the impedance sensor 145) may also be correlated with other metrics, e.g., a heart rate variability (HRV), respiratory rate, etc. to determine an intensity of the user's workout and obtain a holistic view of the user's body response. Electrodermal activity or other measurements of skin conductance (e.g., obtained by the impedance sensor 145) can be related to stress in the user's body. Data captured by the impedance sensor 145 can be processed at the headset, the intermediate device, and/or the server platform.

The breath sensor 150 may perform analysis of breath information gathered from the user, e.g., information about a level of $CO_2$ emitted by the user during breathing, humidity information (e.g., dehydration level) in a breath of the user, information about a level of alcohol in a breath of the user, some other breath information, or combination thereof. The breath information captured by the breath sensor 150 may be utilized (alone or in combination with other health information data captured by other sensors) for, e.g., a health-related diagnostic of the user. For example, a respiratory rate measured by the breath sensor 150 may be an early indicator of various physiological conditions such as hypoxia (low levels of oxygen in the cells), hypercapnia (high levels of carbon dioxide in the bloodstream), metabolic and respiratory acidosis, etc. Data captured by the breath sensor 150 can be processed at the headset, the intermediate device, and/or the server platform.

The activity tracking sensor 155 may capture activity tracking information for the user. The activity tracking sensor 155 may be implemented as an accelerometer and/or a GPS (Global Positioning System) sensor. Activity tracking information may also be accomplished from gaze statistics as measured by, e.g., one or more gaze sensors 115. In some embodiments, the activity tracking information captured by the activity tracking sensor 155 may be combined with health information data captured by other sensors embedded into the frame 105 and utilized for, e.g., a health-related diagnostic of the user. The activity tracking information such a speed of user's movement, statistics on user's daily steps, etc. may be correlated with an improved cardiovascular health that when combined with other sensor information can provide a holistic view of the health of the user. Activity tracking information obtained by the activity tracking sensor 155 can be processed at the headset, the intermediate device, and/or the server platform.

The controller 160 may control operations of one or more components of the headset 100. The controller 160 may be embedded into the frame 105 and coupled (i.e., interfaced) with the various sensors embedded into the frame 105, the imaging device 119, and the transceiver 165. The controller 160 may comprise a processor and a non-transitory computer-readable storage medium (e.g., memory). The controller 160 may be configured to receive at least a portion of health information data captured by the various sensors and/or the imaging device 119 and pre-process the at least the portion of health information data to generate a pre-processed portion of the health information data. The controller 160 may provide the pre-processed portion of the health information data to the transceiver 165 for further communication to the intermediate device. The controller 160 may store the captured raw health information data obtained from the sensors on its own non-transitory storage medium. At a later time (e.g., during charging of the headset 100 and/or the intermediate device), the controller 160 may provide the stored raw health information data to the transceiver 165 for further communication to the intermediate device. Alternatively or additionally, the controller 160 can compress the captured health information data to reduce a size of data being transferred to the intermediate device, e.g., in order to fit data transfer into an available communication bandwidth.

The controller 160 may further extract one or more features related to the user from the captured health information data. The extracted feature(s) may include one or more features of user's eyes, such as a pupil center position, pupil area, pupil velocity, pupil constriction amplitude, pupil constriction latency, blink type, blink rate, PERCLOS information, blink statistics (e.g., eyelid closing duration, duration of eyes being closed, and eyelid opening duration), vergence, gaze distance, gaze location, saccade rate, saccade direction, fixation rate, some other eye feature, or combination thereof. The extracted feature(s) may also include one or more features related to a user's mouth, e.g., types of food being eaten, how often the user eats, an amount of food per meal, some other mouth related feature, or combination thereof. The controller 160 may process the extracted feature(s) for performing, e.g., a health-related diagnostic of the user.

In some embodiments, the controller 160 may rank at least some of the captured raw health information data, and the controller 160 may send higher ranked user's data to the transceiver 165 before lower ranked user's data so that the higher ranked user's data will be communicated to the intermediate device before the lower ranked user's data. For example, highly detailed raw data (e.g., detailed eye images) could be ranked low due to their high bandwidth requirement, wherein some other raw data that has a lessor bandwidth requirement could be ranked higher (e.g., information about a user's pupil, such as information about a pupil's location in a captured image of a user's eye and/or information about a size of the pupil).

The transducer 165 may communicate health information data captured by various sensors embedded to the frame 105 to an intermediate device (e.g., a smartphone, laptop, tablet, personal computer, etc.) communicatively coupled to the headset 100. Additionally, the transceiver 165 may obtain the pre-processed portion of health information data from the controller 160 and communicate the pre-processed portion of health information data to the intermediate device. To preserve a communication bandwidth between the headset 100 and the intermediate device, the transceiver 165 may transmit the health information data at a first frequency and the pre-processed portion of health information data at a second frequency greater than the first frequency as the pre-processed portion of health information data may be of a smaller size (e.g., compressed) in comparison with raw (i.e., unprocessed) health information data. The transceiver 165 may communicate the health information data to the intermediate device continuously or intermittently. In one or more embodiments, the transceiver 165 communicates the captured raw health information data to the intermediate device based on ranking of the raw data, e.g., higher ranked user's data are sent before lower ranked user's data. The transceiver 165 may be communicatively coupled to the intermediate device via, e.g., a wired or wireless connection.

The headset 100 described herein may be used for other applications uses in addition to those described above. Applications of the headset 100 can be in digital health, multisensory augmentation, augmented reality, virtual reality, mixed reality, fall detection, human-computer interaction, drowsiness detection (e.g., during driving), monitoring progression of neurological diseases, alerts/reminders (e.g., for prescriptions), cognitive load monitoring, stroke detection, some other application, or combination thereof.

Figure 2A:
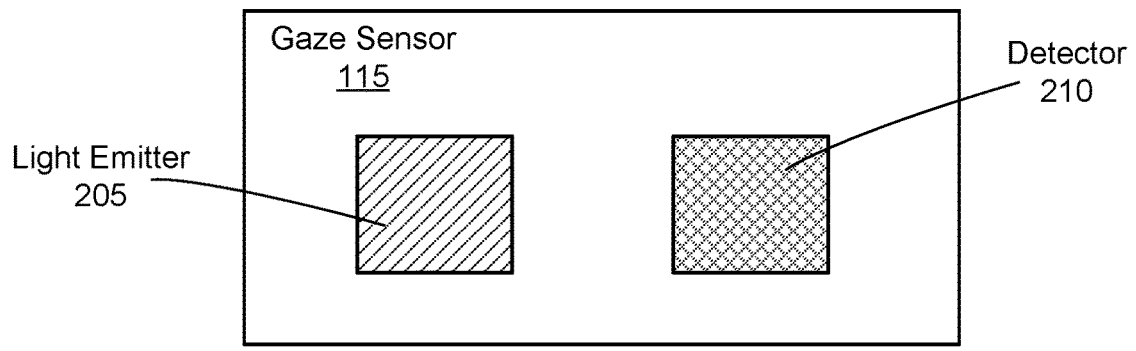
FIG. 2A illustrates an example of a gaze sensor of the headset in FIG. 1.

FIG. 2A illustrates an example 200 of a gaze sensor 115, in accordance with one or more embodiments. The gaze sensor 115 shown in FIG. 2A is implemented as a package of combined light emitter 205 and a detector 210.

The light emitter 205 is configured to emit tracking light. The light emitter 205 may be, e.g., a light emitting diode (LED), mini-LED, micro-LED, vertical-cavity surface-emitting laser (VCSEL), some other emitter of tracking light, or some combination thereof. The light emitter 205 may emit in the infrared (IR) band. The light emitter may be a narrow band emission source.

The detector 210 detects a version of the emitted tracking light reflected from at least one surface of an eye. The detector 210 may be a photodiode, photoresistor, some other type of light detector, or some combination thereof. The detector 210 may operate as an IR detector. In one or more embodiments, an IR filter (not shown in FIG. 2A) may be located in front of the detector 210 to restrict ambient noise. When the user's pupil is gazing at the light emitter 205/detector 210 pair, an amount of light reflected from the pupil and returned to the detector 210 is maximized, which is detected as a 'gaze-into' event (e.g., by the controller 160). In some cases, the detected 'gaze-into' event (e.g., maximum light signal detected at the detector 210) may be outlier, i.e., certain anomaly may be detected. To avoid this, the detector 210 may be configured to reject ambient light (e.g., sunlight), i.e., by placing an appropriate filter in front of the detector 210. The gaze sensor 115 having the light emitter 205 operating in combination with the detector 210 can sense a user's bright pupil continuously while providing advantages related to implementation simplicity, smaller form factor and low power consumption.

The light emitter 205 and the detector 210 are effectively co-aligned or co-incident. This means that tracking light emitted from the light emitter 205 and traveling along an optical axis that reflects from the eye and propagates back along that axis is detected by the detector 210. Alternatively (not shown in FIG. 2A), the gaze sensor 115 can be implemented as a single device (i.e., combined light emitter/detector) with two operations time-multiplexed for emitting tracking light and receiving reflected light during different time periods.

Figure 2B:
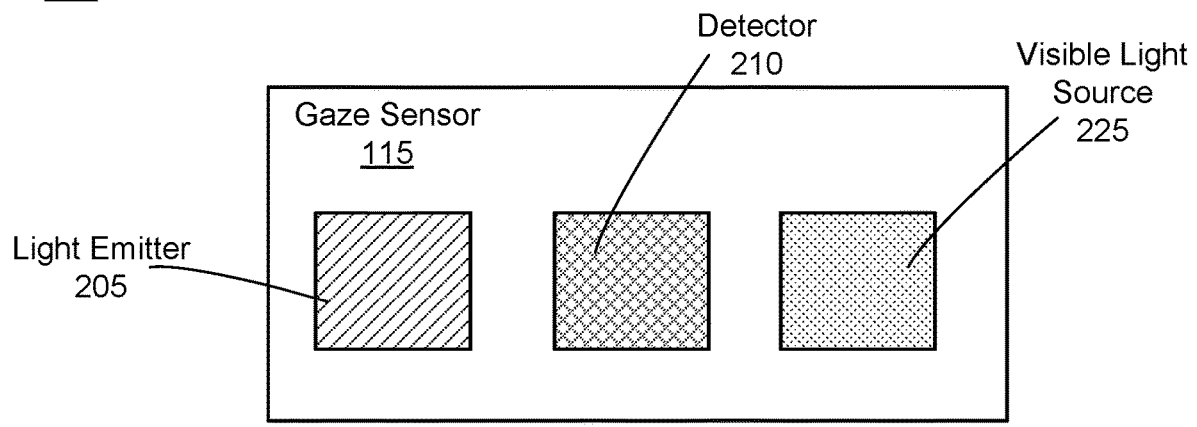
FIG. 2B illustrates an example of a gaze sensor of the headset in FIG. 1 with an integrated visible light source.

FIG. 2B illustrates an example 220 of a gaze sensor 115 with an integrated visible light source 225, in accordance with one or more embodiments. The gaze sensor 115 in FIG. 2B includes the light emitter 205, the detector 210, and the integrated visible light source 225.

The visible light source 225 emits light in the visible band, e.g., based on instructions from the controller 160. The visible light source 225 may be implemented as a visual feedback LED (i.e., visible LED) that indicates whether the 'gaze-into' event is detected (e.g., by the controller 160) at the gaze sensor 115. The emitted light in the visible band may be of a tunable wavelength. Alternatively, the emitted light in the visible band may be composed of multiple colors (e.g., green, blue and/or red). The emitted light in the visible band may be collimated, e.g., by a recessed channel 245 illustrated in FIG. 2D, or by folded optics embedded into the frame that restrict an eye box of the gaze sensor 115.

Responsive to the determination that a user's gaze vector is within a threshold distance of the gaze sensor 115, the visible light source 225 is instructed (e.g., by the controller 160) to emit visible collimated light towards the user's eye. In one embodiment, the visible light source 225 (e.g., visual feedback LED) can be normally turned on (i.e., being active without blinking), and blink only when the 'gaze-into' event is detected. Alternatively, in another embodiment, the visible light source 225 (e.g., visual feedback LED) can be normally turned off, and turned on only when the 'gaze-into' event is detected. It should be noted that the relative placement of the light emitter 205, the detector 210 and the visible light source 225 can be chosen to minimize the cross-talk. For example, to minimize the cross-talk, the visible light source 225 (e.g., visual feedback LED) can be placed between the light emitter 205 and the detector 210. In one or more embodiments, the visible light source 225 is implemented as a static display element that presents static images, e.g., in accordance with display instructions from the controller 160. In one or more other embodiments, the visible light source 225 is implemented as a dynamic display element that dynamically updates a displayed image, e.g., in accordance with display instructions from the controller 160.

Figure 3:
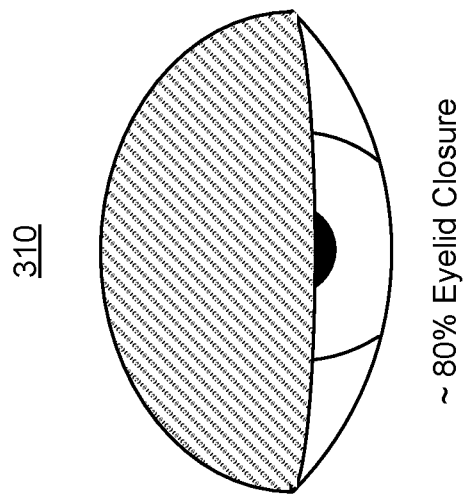
FIG. 3 illustrates an example of eyelid statistics for a user wearing a headset, in accordance with one or more embodiments.
Figure 3:
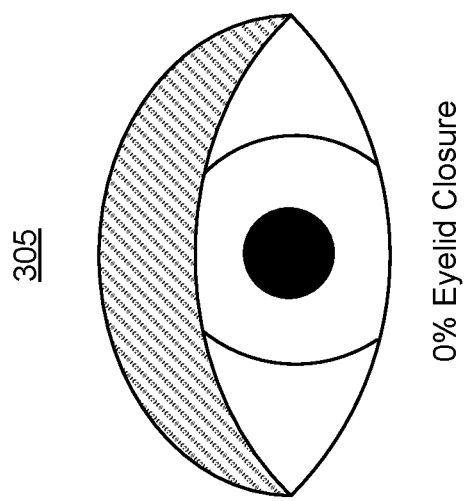

FIG. 3 illustrates an example of eyelid statistics (e.g., PERCLOS) for a user wearing a headset (e.g., the headset 100), in accordance with one or more embodiments. FIG. 3 illustrates an example 305 of PERCLOS equal to 0% that corresponds to un-occluded pupil (i.e., fully open eye), and an example 310 of PERCLOS equal to approximately 80% that corresponds to the pupil occluded by an eyelid at approximately 80% of a total pupil's front area. Information about PERCLOS over time essentially relates to information how long it takes for the user to blink. When the user gets more tired (e.g., lose more sleep over time), the user's vigilance is getting slower and takes more time for the user to blink, which is manifested by an increase of PERCLOS over time. Note that PERCLOS is one example of eyelid statistics that measures an eye blink duration. Other eyelid statistics can be related to, e.g., a total blink duration, an eye closing duration, a hold duration at the "bottom" of the blink, an eye reopening duration, etc. Thus, another metric correlated with fatigue and tiredness of the user can be a duration of eye blinks. As the user becomes more tired, blink durations (e.g., a time it takes for the eyelid to close, a time that the eyelid is closed, and a time it takes for the eyelid to open) may lengthen in time. The sensors (e.g., the one or more event sensors 117) embedded into the headset 100 detecting the eyelid statistics can measure the changes in blink duration over time to measure the fatigue state of the user.

As discussed above, the one or more event sensors 117 embedded into the headset 100 may capture eye data related to an amount of occlusion over time for the user's pupil. The controller 160 may process the eye data captured by the one or more event sensors 117 and obtain the eyelid statistics information represented by, e.g., one or more PERCLOS based parameters. An example of the PERCLOS based parameter may include an amount of time per minute that the PERCLOS is greater than a defined threshold percentage (e.g., 80% or 75%). Other examples of PERCLOS based parameters may include a speed of eyelid closure (e.g., an amount of time per minute it takes for PERCLOS to change from 0% to 80%), a speed of eyelid opening (e.g., an amount of time per minute it takes for PERCLOS to change from 80% to 0%), an amount of time per minute the eyelid stay closed (e.g., PERCLOS is at 100%), some other PERCLOS based parameter, or combination thereof.

In some embodiments, the controller 160 can match the eyelid statistics information for the user to a sleep deprivation model for a health-related diagnostic of the user (e.g., determination of user's tiredness). The sleep deprivation model may be obtained by testing multiple subjects (i.e., other users of the healthcare platform) over time by collecting their sleep deprivation data. Sleep trackers may be worn by the test subjects that provide the sleep deprivation data to the healthcare platform, e.g., based on subjective inputs from the test subjects in relation to their tiredness over a defined period of time. The sleep deprivation data from the test subjects may be provided to the headset 100 as information about the sleep deprivation model, e.g., via one or more partner application devices of the test subjects communicatively coupled with the intermediate device and the headset 100. In some other embodiments, the eyelid statistics information obtained at the headset 100 may be provided (e.g., via the transceiver 165) to the intermediate device, and the intermediate device may perform matching between the eyelid statistics information and the sleep deprivation model for the health-related diagnostic of the user, e.g., for obtaining an updated sleep deprivation model for the user.

While the eyelid statistics information can be used to measure sleep deprivation, the eyelid statistics information may also be used to estimate user's focus and/or attention—and thereby produce a mapping between amount of sleep deprivation and reduced focus. The mapping between amount of sleep deprivation and reduced focus can be useful in, e.g., providing the user with a qualitative measure of how much sleep they can lose before their work may start to suffer. For example, after getting a permission from an employee, an employer may issue the headset 100 to the employee and use the eyelid statistics information obtained at the headset 100 to track a fatigue metric vs. a performance metric of the employee. If the performance metric and/or the fatigue metric get above a threshold level, the employer may modify a shift schedule for the employee. Examples of professions that can utilize the eyelid statistics information for monitoring focus and/or attention of its employees may include: firemen, air traffic control personnel, pilots, professional drivers, medical professionals, or any other fields where fatigue of an employee could have major consequences.

Fatigue tracking measures through eyelid statistics (e.g., PERCLOS, blink duration statistics, etc.) can be used to determine various health-related metrics. For example, information about the eyelid statistics may be used to determine how long each individual user needs to sleep (e.g., an eight hour of sleep on average is an imprecise metric that does not apply to everyone), as well as the user's sleep sensitivity (i.e., how sensitive the user is to missing sleep). This can be estimated from eyelid statistics alone (e.g., captured by the one or more event sensors 117) or in combination with sleep data gathered from other sleep tracking devices (e.g., wearable devices, sleep mats, etc.). Furthermore, the eyelid statistics may quantitatively measure a user's fatigue/performance/energy state throughout the day. Additionally or alternatively, the eyelid statistics may provide a measure on how a user's sleep needs change over time (e.g., daily, weekly, monthly) depending on various factors in their lives (e.g., are they sick, are they recently jet lagged, etc.). The eyelid statistics may be also utilized to correlate a user's sleep durations and user's sleep quality with their performance/energy levels throughout the day.

Eye blink duration statistics obtained from data captured by the one or more event sensors 117 (e.g., time it takes for the eyelid to close, time that the eyelid is closed, and time it takes for the eyelid to open) can be used to estimate, e.g., psychomotor performance for the user. For example, the psychomotor vigilance test (PVT) is a sustained-attention reaction-timed task that measures a speed with which subjects respond to a visual or auditory stimulus. Reaction times and lapses in PVT experiments can be correlated to an increased fatigue and tiredness as well as a sleep debt (the amount of sleep required by the body subtracted by the amount of sleep received over the course of a defined time). The eye blink duration statistics may be correlated with PVT reaction times and lapses and can be used as a metric that is continuously monitored by the one or more event sensors 117 measuring the eye and eyelid movements. In this manner, the eye blink duration statistics can be used to measure psychomotor performance for the user and correlate the measured psychomotor performance to sleep, track the psychomotor performance throughout the day, week, month, or year, and can be used to estimate the user's sleep need and sleep sensitivity.

Figure 4:
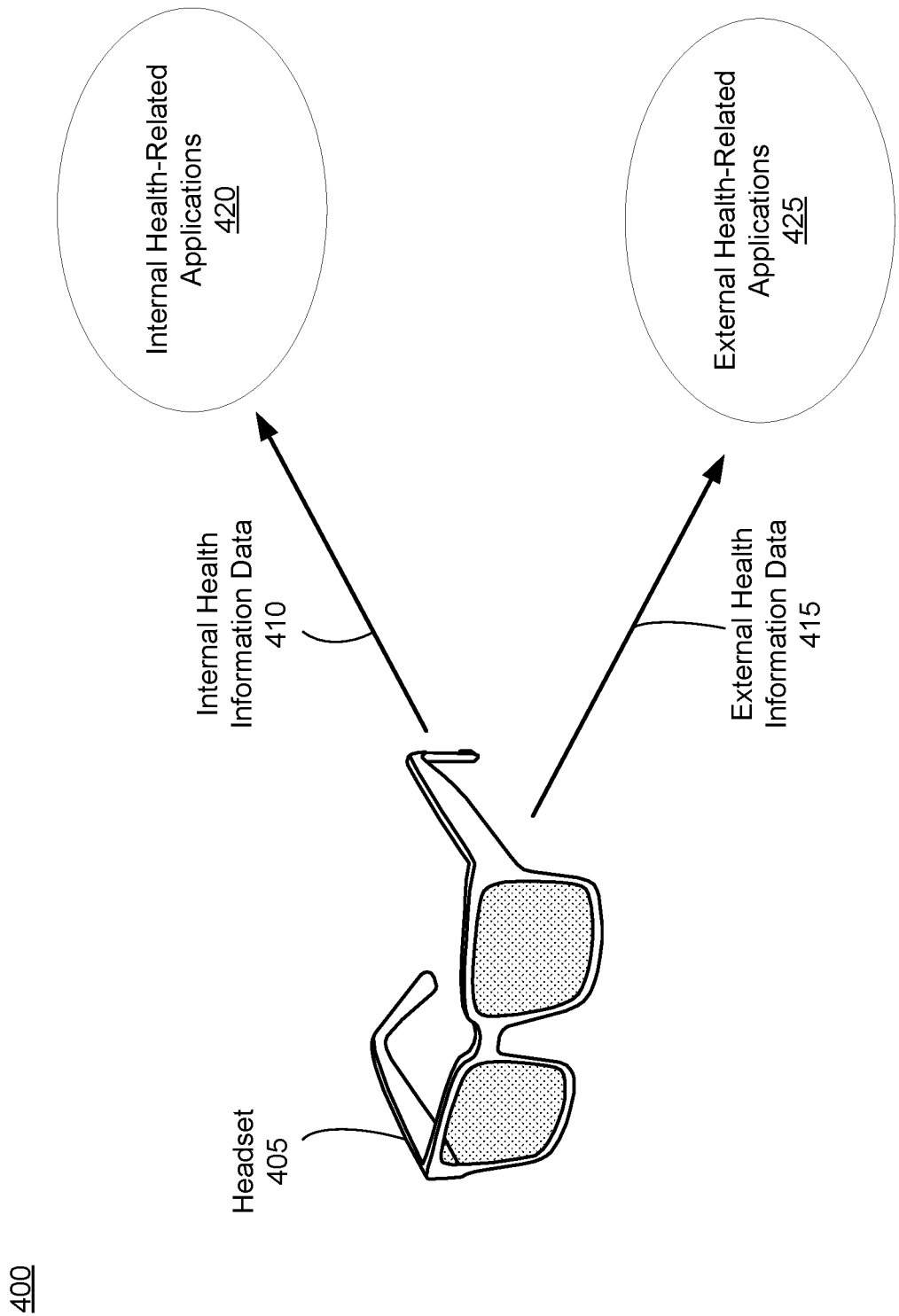
FIG. 4 illustrates an example a headset providing health information data for different health-related applications, in accordance with one or more embodiments.

FIG. 4 illustrates an example 400 of a headset 405 providing health information data for different health-related applications, in accordance with one or more embodiments. The headset 405 may be an embodiment of the headset 100. Health information data for a user wearing the headset 405 may be captured by various sensors embedded into the headset 405, as illustrated in relation to the headset 100 in FIG. 1. The captured health information data may be divided (e.g., by a controller of the headset 405) into at least two portions: internal health information data 410 and external health information data 415.

The headset 405 may communicate (e.g., via a transceiver of the headset 405) the internal health information data 410 to an intermediate device (e.g., smartphone, table, laptop, etc.) paired with the headset 405 and used by the same user that wears the headset 405. The intermediate device may utilize (e.g., process) the received internal health information data 410 for, e.g., various internal health-related applications 420 functioning as part of a healthcare platform. Some examples of the internal health-related applications 420 include: posture monitoring for the user wearing the headset 405, digital device hygiene of the user (e.g., implementation of the 20/20/20 rule for the user), device unlocking (e.g., whenever the user looks to a screen of the intermediate device, the screen would automatically unlock regardless on whether the screen has face identification implemented on it), identification of the user based on eye movements, detection of the user's current activity (e.g., whether they are currently reading, browsing images on a screen, watching a video, looking to a sign or billboard, speaking to another person or another user of a similar paired device, resting with their eyes closed), suspension of digital notifications while the user is engaged in an activity, some other application, or combination thereof.

The headset 405 may communicate (e.g., via the transceiver) the external health information data 415 to one or more external third parties (e.g., other user(s) and/or partner application device(s)). The one or more external third parties may utilize (e.g., process) the received external health information data 415 for, e.g., various external health-related applications 425 also functioning as part of the healthcare platform. The external health-related applications 425 may be any health-related application not being directly associated with a health-related diagnostic of the user wearing the headset 405. For example, to implement their own health-related algorithms, the one or more external parties may require access to raw user's data (e.g., the external health information data 415). The external health information data 415 may be directly provided to the one or more external third parties from the headset 405. Alternatively, the external health information data 415 may be relayed to the one or more external third parties via the intermediate device.

Figure 5:
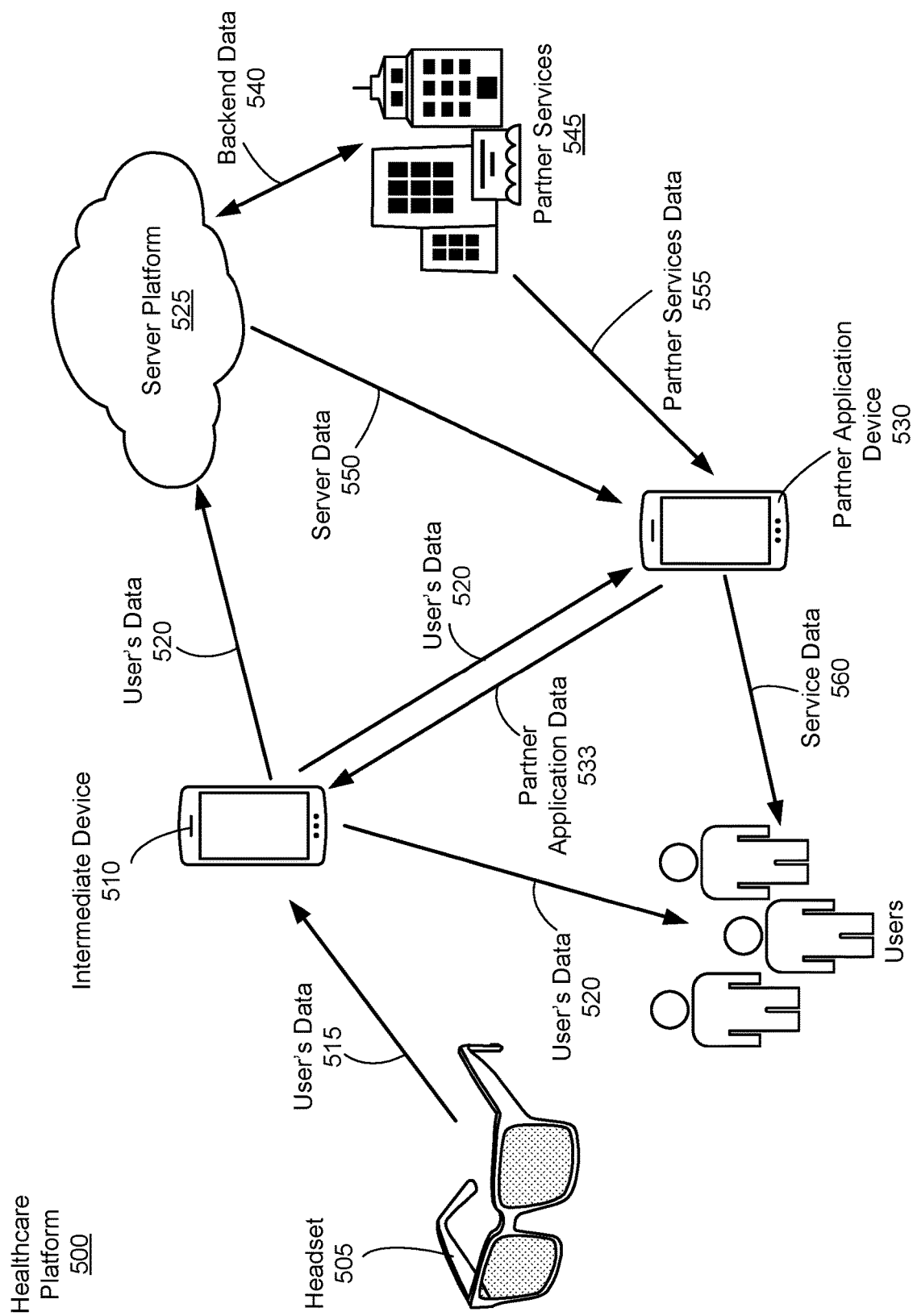
FIG. 5 illustrates an example healthcare platform with a headset, in accordance with one or more embodiments.

FIG. 5 illustrates an example healthcare platform 500 with a headset 505, in accordance with one or more embodiments. The headset 505 may be an embodiment of the headset 100. The headset 505 (e.g., electronic eyeglasses) as part of the healthcare platform 500 may capture user's data via one or more sensors mounted on the headset 505. The headset 505 can perform basic processing for closed-loop healthcare functions. For example, a focus depth of the user's gaze may be computed in real time from captured images of the user's eyes to dynamically adjust a focus-tunable lens of the headset 505 in the user's field of view. Additionally or alternatively, the pupil position, blink rate, and saccade rate may be computed as part of the depth estimation, and may have closed-loop applications in real-time on the headset 505 as well.

The headset 505 can be interfaced (e.g., via a wired or wireless connection) with an intermediate device 510. The intermediate device 510 can be, e.g., a smartphone, laptop, desktop computer, tablet, a VR system, an AR system, a MR system, some other device or system, or combination thereof. The headset 505 may communicate user's data 515 to the intermediate device 510, e.g., via a wired or wireless connection. The user's data 515 may include raw data captured at the headset 505 and/or information about one or more features extracted from the user's raw data. The wired connection between the headset 505 and the intermediate device 510 may be implemented as, e.g., a security digital (SD) card connection, Universal Serial Bus (USB) connection, Ethernet connection, some other wired connection, or combination thereof. The wireless connection between the headset 505 and the intermediate device 510 may be implemented as, e.g., a Bluetooth, WiFi, some other wireless connection, or combination thereof. In one embodiment, the user's data 515 can be transferred from the headset 505 to the intermediate device 510 in batches, i.e., as offline off-loading of data. In another embodiment, the user's data 515 can be transferred continuously from the headset 505 to the intermediate device 510.

As aforementioned, some portion of the user's data 515 occupying a higher portion of an available communication bandwidth (e.g., full raw image data) can be communicated to the intermediate device 510 at a frequency lower than a threshold frequency (i.e., at a low frequency). In some other embodiments, some other portion of the user's data 515 occupying a lower portion of the available communication bandwidth (e.g., basic eye tracking information such as pupil position data) can be communicated to the intermediate device 510 at a frequency higher than the threshold frequency (e.g., at a high frequency). Furthermore, as aforementioned, the headset 505 may communicate the captured user's raw data to the intermediate device 510 based on ranking of the raw data.

The intermediate device 510 may perform (e.g., via a controller of the intermediate device 510) intermediate processing of the captured raw user's data obtained from the headset 505. The intermediate device 510 may also extract one or more features from the captured user's data. In some embodiments, the intermediate device 510 may perform processing of high resolution user's data (e.g., full image data) at a frequency lower than a threshold frequency (i.e., at a low frequency, such as once a day). In some other embodiments, e.g., to obtain information about trends, the intermediate device 510 may perform processing of intermediate data results (i.e., user's data previously pre-processed at the headset 505) at a frequency higher than the threshold frequency (i.e., at a mid-frequency, such as several times per hour). In some other embodiments, the intermediate device 510 may perform processing of raw user's data (e.g., pupil position) at a frequency higher than another threshold frequency (i.e., at a high frequency).

The intermediate device 510 may provide user's data 520 to a server platform 525 (e.g., cloud platform) and/or at least one third party application device, i.e., partner application device 530. The user's data 520 may comprise a portion of the raw user's data 515 and another portion of processed user's data. Alternatively or additionally, the user's data 520 can be utilized by one or more users 535 of the intermediate device 510. Furthermore, one or more specific health-related applications can be deployed on the intermediate device 510, e.g., to utilize the user's data 515 transferred from the headset 505. In one or more embodiments, information about eye movements based on pupil positions in the captured eye image(s) can be processed at the intermediate device 510 to detect, e.g., a recent stroke. For example, a "blown" pupil, or one pupil being significantly larger than the other may be an indicator of neurological damage caused be certain types of strokes. By measuring the pupil size inconsistency, a metric for stroke detection can be measured. In addition, there can be a region of neglect in the user's field of view after a stroke. A significant lack of gaze in a particular region (as measured from the gaze tracking data) can indicate the development of a region of neglect. In some cases, the location of the region of neglect can even specify the location of the lesion on the brain that caused the stroke.

Alternatively or additionally, raw images or sequences of images may be processed at the intermediate device 510 to perform higher quality estimates of a pupil size and shape over time, e.g., for diagnostic and/or calibration purposes. The intermediate device 510 may use information about pupil's occlusion captured at the headset 505 to determine eyelid statistics information (e.g., PERCLOS information) for the user. Furthermore, the intermediate device 510 may correlate the determined eyelid statistics information to a sleep deprivation model of multiple test subjects for a health-related diagnostic of the user (e.g., determination of user's tiredness). The intermediate device 510 may obtain information about the sleep deprivation model from, e.g., the one or more partner application devices 530 (e.g., one partner application device 530 for each test subject) as part of partner application data 533 transmitted (e.g., via a wireless link) from the one or more partner application devices 530 to the intermediate device 510.

The intermediate device 510 may serve as a relay node for transferring the user's data 515 from the headset 505 to the server platform 525. Data from the intermediate device 510 (e.g., raw data, extracted features, some other user's data captured by one or more sensors of the headset 505, or combination thereof, collectively referred to as the user's data 520) can be transferred (e.g., uploaded) to the server platform 525, e.g., by a transceiver or some other communication module of the intermediate device 510. In some embodiments, the user may adjust privacy settings to allow or prevent the intermediate device 510 from providing the user's data 520 to any remote systems including the server platform 525.

The server platform 525 can perform advance processing on the user's data 520 received from the intermediate device 510. In some embodiments, the server platform 525 can perform high compute image processing on full raw image data captured (e.g., at a low frequency) by one or more imaging devices mounted on the headset 505. In some other embodiments, the server platform 525 can perform advanced processing on the raw user's data and/or compressed user's data (or features) uploaded from the intermediate device 510.

In some embodiments, the server platform 525 can provide user's data (e.g., with or without advance processing being applied on the user's data) as backend data 540 to one or more partner services 545 (e.g., partner server platforms or partner cloud services), e.g., via one or more backend communication channels between the server platform 525 and the one or more partner services 545. The server platform 525 may operate as a node that one or more external parties (i.e., the one or more partner services 545) can connect to and access the user's data through, e.g., an API of the server platform 525.

Various health related applications can be built on top of the API of the server platform 525 for several different purposes. At least some of the health related applications can be built for utilization by one or more external third parties (e.g., the one or more partner application devices 530). Alternatively or additionally, one or more health related applications can be built internally, e.g., for utilization by the intermediate device 510. To implement their own algorithms, the one or more external parties (e.g., the one or more partner application devices 530) may require access to the user's data that the server platform 525 can provide, e.g., as server data 550. Alternatively, the user's data 520 can be directly provided to the one or more partner application devices 530 from the intermediate device 510. For example, the one or more other external parties (e.g., the one or more partner application devices 530) may only require access to features extracted from the raw user's data 515 (e.g., extracted at the intermediate device 510 or at the server platform 525) for ease of development. The server platform 525 may offer functions that expose individual data streams at a particular time instant, or during a time series. The server platform 525 may apply different levels of processing (e.g., high frequency processing, mid-frequency frequency, low frequency processing, etc.) on the user's data 520 acquired from the intermediate device 510 to provide various statistics on changes in certain data features, e.g., over the course of the minute, hour, day, week, etc.

In some embodiments, upon a request from the partner application device 530, the server platform 525 can provide raw user's data (e.g., raw data captured by one or more sensors mounted on the headset 505) and/or intermediate output data (e.g., user's data processed at the intermediate device 510) as the service data 560 to the partner application device 530, e.g., via the API of the server platform 525. Similarly, as for the implementation of intermediate device 510, the partner application device 530 can be implemented as, e.g., a smartphone, laptop, desktop computer, tablet, AR system, VR system, MR system, some other device or system, or combination thereof. Furthermore, the one or more partner services 545 (i.e., partner server platforms) can provide some user's data (e.g., mobile health data) as partner services data 555 to the partner application device 530. In some embodiments, the partner services data 555 communicated from the one or more partner services 545 to the partner application device 530 are high compute low frequency services (e.g., full resolution image data) obtained through high compute processing at the server platform 525 or at the one or more partner server platforms of the one or more partner services 545. In some other embodiments, the partner services data 555 communicated from the one or more partner services 545 to the partner application device 530 are mid-compute high frequency services that can be further processed at the partner application device 530. Examples of the mid-compute high frequency services include but are not limited to pattern recognition and/or filtering of stored user's data over time to detect subtle changes in diagnostic properties of the user's data.

In some other embodiments, the partner application device 530 can directly obtain at least a portion of the user's data 520 from the intermediate device 510, which can be further processed and utilized by the partner application device 530. The portion of user's data 520 directly obtained at the partner application device 530 from the intermediate device 510 may include eye gesture data for user interface applications, such as engaging hands-free media controls or activating remote camera controls, real time feedback to a guided meditation experience, or transferring of raw images that may be processed by a third party on a local processor of its application device without unnecessary communication costs of uploading to the server platform 525 and downloading from the server platform 525. The one or more users 535 can utilize service data 560 with one or more partner services running on the partner application device 530.

Figure 6:
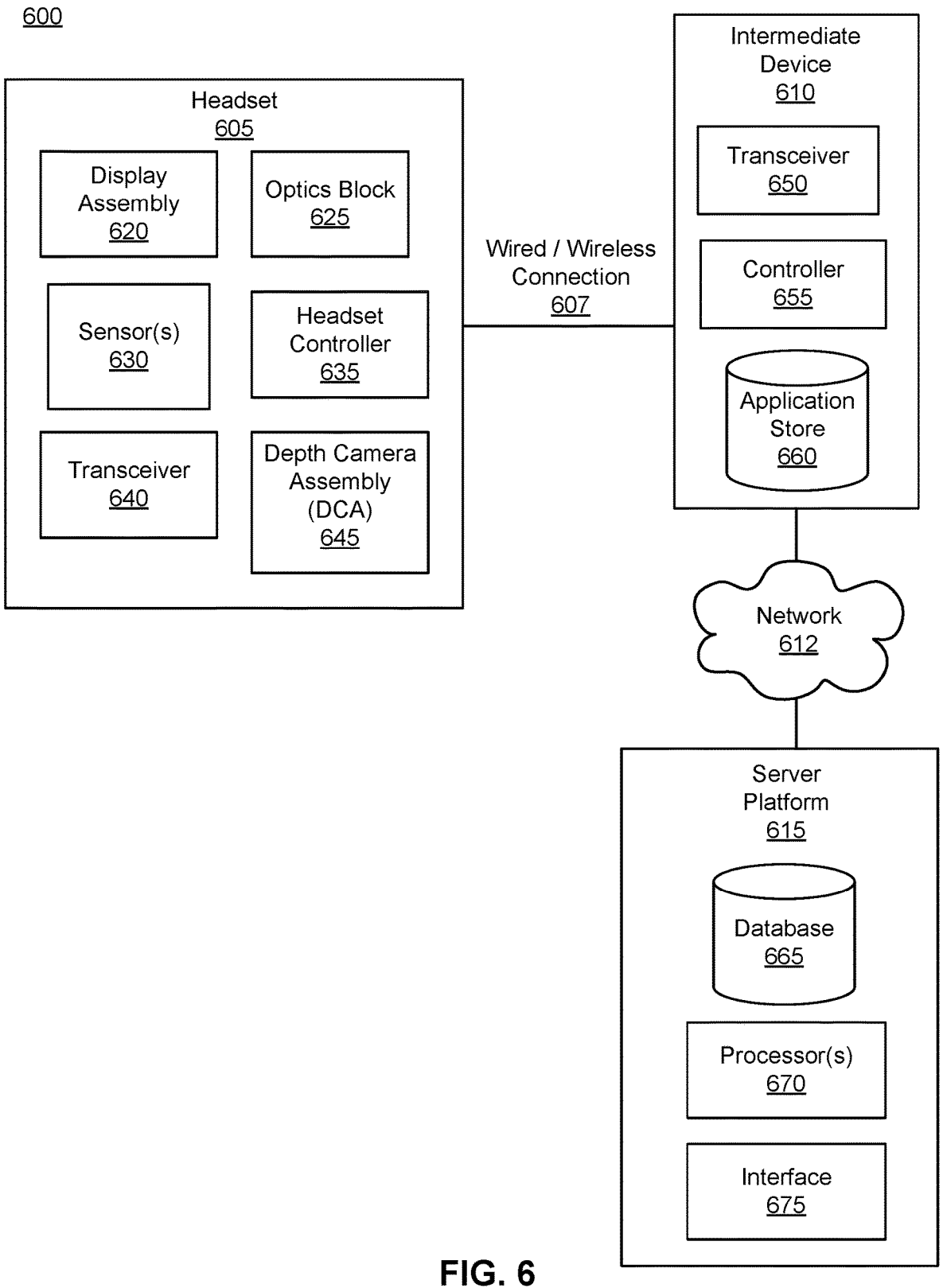
FIG. 6 is a block diagram of a healthcare platform that includes a headset, in accordance with one or more embodiments.

FIG. 6 is a block diagram of a healthcare platform 600 that includes a headset 605, in accordance with one or more embodiments. The healthcare platform 600 shown by FIG. 6 includes the headset 605, an intermediate device 610, and a server platform 615 coupled to the intermediate device 610 via a network 612. In some embodiments, the healthcare platform 600 may be the healthcare platform 500, the headset 605 may be the headset 100 or the headset 505, the intermediate device 610 may be the intermediate device 510, and the server platform 615 may be the server platform 525. In alternative configurations, different and/or additional components may be included in the healthcare platform 600. Additionally, functionality described in conjunction with one or more of the components shown in FIG. 6 may be distributed among the components in a different manner than described in conjunction with FIG. 6 in some embodiments.

The headset 605 includes a display assembly 620, an optics block 625, one or more sensors 630, a headset controller 635, a transceiver 640, and a DCA 645. Some embodiments of the headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 620 displays content to a user wearing the headset. The display assembly 620 displays the content using one or more display elements (e.g., the lenses 110). A display element may be, e.g., an electronic display. In various embodiments, the display assembly 620 comprises a single display element or multiple display elements (e.g., a display for each eye of the user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the lens 110 may also include some or all of the functionality of the optics block 625.

The optics block 625 may magnify image light received from the electronic display, corrects optical errors associated with the image light, and presents the corrected image light to one or both eye boxes of the headset 605. In various embodiments, the optics block 625 includes one or more optical elements. Example optical elements included in the optics block 625 include: an aperture, a Fresnel lens, a convex lens, a concave lens, a filter, a reflecting surface, or any other suitable optical element that affects image light. Moreover, the optics block 625 may include combinations of different optical elements. In some embodiments, one or more of the optical elements in the optics block 625 may have one or more coatings, such as partially reflective or anti-reflective coatings.

Magnification and focusing of the image light by the optics block 625 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110° diagonal), and in some cases, all of the user's field of view. Additionally, in some embodiments, the amount of magnification may be adjusted by adding or removing optical elements.

In some embodiments, the optics block 625 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 625 corrects the distortion when it receives image light from the electronic display generated based on the content.

The one or more sensors 630 may capture data related to a health of a user wearing the headset 605. In some embodiments, the one or more sensors 630 may include at least one of the one or more gaze sensors 115, the one or more event sensors 117, the position sensor 120, the one or more acoustic sensors 125, the brain activity sensor 130, the environmental sensor 135, the temperature sensor 140, the impedance sensor 145, the breath sensor 150, and the activity tracking sensor 155. Alternatively, the one or more sensors 630 may be configured to perform the same operations as at least one of the one or more gaze sensors 115, the one or more event sensors 117, the position sensor 120, the one or more acoustic sensors 125, the brain activity sensor 130, the environmental sensor 135, the temperature sensor 140, the impedance sensor 145, the breath sensor 150, and the activity tracking sensor 155.

The headset controller 635 may process at least a portion of the health data captured by the one or more sensors 630 and provide the processed health data to the transceiver 640. In some embodiments, the headset controller 635 may be the controller 160 or configured to perform the same operations as the controller 160.

The transceiver 640 may communicate, via the wired or wireless connection 607, the raw health data captured by the one or more sensors 630 and the processed heath data to the intermediate device 610 for further processing of the captured health data and utilization of the processed health data for, e.g., a health-related diagnostic of the user. In some embodiments, the transceiver 640 may be the transceiver 165 or configured to perform the same operations as the transceiver 165.

The DCA 645 generates depth information for a portion of a local area of the headset 605. The DCA 645 includes one or more imaging devices and a DCA controller. The DCA 645 may also include an illuminator. Operation and structure of the DCA 645 is described above in conjunction with FIG. 1.

The wired connection 607 between the headset 605 and the intermediate device 610 may be implemented as, e.g., a SD card connection, USB connection, Ethernet connection, some other wired connection, or combination thereof. The wireless connection between the headset 605 and the intermediate device 610 may be implemented as, e.g., a Bluetooth, WiFi, some other wireless connection, or combination thereof.

The intermediate device 610 may be, e.g., a smartphone, laptop, desktop computer, tablet, a VR system, an AR system, a MR system, some other device or system, or combination thereof. The intermediate device 610 includes a transceiver 650, a controller 655, and an application store 660. Some embodiments of the intermediate device 610 have different components than those described in conjunction with FIG. 6. Additionally, the functionality provided by various components described in conjunction with FIG. 6 may be differently distributed among the components of the intermediate device 610 in other embodiments, or be captured in separate assemblies remote from the intermediate device 610.

The transceiver 650 may receive the health data (i.e., raw health data and processed health data) from the headset 605. The transceiver 650 may also transfer (e.g., upload via the network 612) the received health data and/or a processed version of the received health data to the server platform 615. The transceiver 650 may further transmit the received health data and/or the processed version of received health data to one or more partner application devices (not shown in FIG. 6).

The controller 655 may perform intermediate processing of the raw health data obtained from the headset 605. The controller 655 may also extract one or more features from the raw health data. The controller 655 may further perform processing of high resolution user's data (e.g., full image data). In some embodiments, the controller 655 may perform processing of intermediate data results (i.e., user's data previously pre-processed at the headset 605).

The application store 660 stores one or more health-related applications for execution at the intermediate device 610 (e.g., by the controller 655). An application is a group of instructions, that when executed by the controller 655, generates content for presentation to the user. Content generated by an application may be in response to inputs received from the user. Examples of health-related applications include: detection of a recent stroke based on information about user's eye movements, an application for a health-related diagnostic based on information about user's pupil size and shape over time, posture monitoring, digital device hygiene, detection of the user's activity for a period of time, an application for a health-related diagnostic based on user's brain activity, an application for a health-related diagnostic based on user's food diet, an application for a health-related diagnostic based on user's breathing, an application for a health-related diagnostic based on user's temperature, or other suitable health-related applications.

The network 612 couples the intermediate device to the server platform 615. The network 612 may include any combination of local area and/or wide area networks using both wireless and/or wired communication systems. For example, the network 612 may include the Internet, as well as mobile telephone networks. In one embodiment, the network 612 uses standard communications technologies and/or protocols. Hence, the network 612 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 612 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 612 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The server platform 615 includes a database 665, one or more processors 670, and an interface 675. Some embodiments of the server platform 615 have different components than those described in conjunction with FIG. 6. Additionally, the functionality provided by various components described in conjunction with FIG. 6 may be differently distributed among the components of the server platform 615 in other embodiments, or be captured in separate assemblies remote from the server platform 615.

The database 665 may store user's health data (e.g., raw health data as captured by the one or more sensors 630 and/or the processed version of health data as processed at the intermediate device 610). The database 665 may be a non-transitory computer readable storage medium.

The one or more processors 670 may efficiently perform a large amount of computations to, e.g., extract various statistics and/or features from the user's health data obtained from the intermediate device 610 for exposing the extracted data to third parties through, e.g., the interface 675. The one or more processors 670 may also perform advance processing on the user's data 520 obtained from the intermediate device 610 (e.g., high compute image processing). Further, the one or more processors 670 may apply different levels of processing (e.g., high frequency processing, mid-frequency frequency, low frequency processing, etc.) on the user's data 520 acquired from the intermediate device 610 to provide various statistics on changes in certain data features.

The interface 675 may connect the server platform 615 with one or more partner server platforms (not shown in FIG. 6) and/or the one or more partner application devices for transferring the user's health data (e.g., as processed by the one or more processors 670). In some embodiments, the interface 675 may be implemented as an API. The API of the server platform 615 may be implemented using one or more programming languages, e.g., Python, C, C++, Swift, some other programming language, or combination thereof.

One or more components of the healthcare platform 600 may contain a privacy module that stores one or more privacy settings for user data elements. The user data elements describe the user, the headset 605 or the intermediate device 610. For example, the user data elements may describe sensitive health information data of the user, a physical characteristic of the user, an action performed by the user, a location of the user of the headset 605, a location of the headset 605, a location of the intermediate device 610, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The healthcare platform 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

FIG. 7 is a flow chart illustrating a process 700 for utilizing a headset for a health-related diagnostic of a user wearing the headset, in accordance with one or more embodiments. The process 700 of FIG. 7 may be performed by the components of a headset (e.g., the headset 100). Other entities (e.g., components of the healthcare platform 600) may perform some or all of the steps of the process 700 in other embodiments. Likewise, embodiments may include different and/or additional steps, or perform the steps in different orders.

The headset captures 710 (e.g., via one or more sensors embedded into a frame of the headset) health information data for a user wearing the headset. The health information data may comprise at least one of: data related to an eye of the user, data related to a skin of the user, data related to an orientation of a head of the user, data related to a brain activity for the user, data related to a tracked activity of the user, data related to a breathing of the user, and data related to an environment of the headset.

The headset pre-processes 720 (e.g., via a controller of the headset coupled to the one or more sensors) at least a portion of the captured health information data to generate a pre-processed portion of the health information data. The headset may extract (e.g., via the controller) one or more features related to the user from the captured health information data.

The extracted one or more features may comprise at least one of: one or more features of at least one eye of the user, one or more features related to a mouth of the user, one or more features related to position information of the user, or some other features. The one or more features of the at least one eye may comprise eyelid statistics information (e.g., information about a PERCLOS) of the user over time. The headset may process (e.g., via the controller) the eyelid statistics information for the health-related diagnostic of the user. The headset may determine (e.g., via the controller) a respective rank for each type of data of the captured health information data.

The headset communicates 730 (e.g., via a transceiver coupled to the controller) the health information data and the pre-processed portion of health information data to an intermediate device for processing at least one of the health information data and the pre-processed portion of health information data to generate processed health information data for a health-related diagnostic of the user. The headset may communicate (e.g., via the transceiver) to the intermediate device the health information data at a first frequency and the pre-processed portion of health information data at a second frequency greater than the first frequency. The headset may communicate (e.g., via the transceiver) each type of data to the intermediate device in accordance with the respective rank.

The processed health information data may be used by a healthcare application running on the intermediate device for the health-related diagnostic of the user. The intermediate device may communicate the processed health information data to one or more users of the intermediate device for providing information about the health-related diagnostic of the user wearing the headset to the one or more users. Additionally or alternatively, the intermediate device may communicate the processed health information data to at least one of a server platform and one or more application devices for at least one of further processing of the processed health information data and utilization of the processed health information data. The server platform may extract at least one of statistics and features from the processed health information data and provides an access to the at least one of extracted statistics and features for at least one of one or more partner services and the one or more application devices.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset comprising:
   a plurality of sensors embedded into a frame of the headset and configured to capture health information data for a user wearing the headset, the plurality of sensors including an acoustic sensor configured to capture auditory information associated with the user and a plurality of gaze sensors, each of the plurality of gaze sensors comprising:
   a light emitter configured to emit tracking light to an eye of the user, and
   a detector configured to:
      detect a signal of a plurality of signals related to a version of the tracking light reflected from at least one surface of the eye, wherein the plurality of signals detected by the plurality of gaze sensors comprise eye-related data, and
      capture an image of the eye based on the version of the tracking light reflected from the at least one surface of the eye;
   a pair of lenses including a focus-tunable lens capable of having a focal distance dynamically adjusted based on the image of the eye captured by the detector;
   a controller coupled to the plurality of sensors, the controller configured to:
      process, using a natural language processing algorithm, the auditory information to classify the user as exhibiting a language disorder,
      extract, from the eye-related data, information about dilations of pupils of eyes of the user, and determine, based on the extracted information about dilations of pupils, an indication of a possible neurological damage for the user; and a transceiver coupled to the controller, the transceiver configured to communicate, to a wireless intermediate device via a wireless connection, user's data including the health information data, an indication of the user exhibiting the language disorder, and the indication of the possible neurological damage, wherein the wireless intermediate device processes the user's data received from the headset to generate processed user's data for a health-related diagnostic of the user and communicates, via a second wireless connection, a portion of the user's data and a portion of the processed user's data to a server platform for further processing.

2. The headset of claim 1, wherein the health information data comprise at least one of: data related to a skin of the user, data related to an orientation of a head of the user, data related to a brain activity for the user, data related to a tracked activity of the user, data related to a breathing of the user, and data related to an environment of the headset.

3. The headset of claim 1, wherein the controller is further configured to extract one or more features related to the user from the captured health information data.

4. The headset of claim 3, wherein the extracted one or more features comprise at least one of: one or more features of at least one eye of the user, and one or more features related to a mouth of the user.

5. The headset of claim 4, wherein:
the one or more features of the at least one eye comprise information about eyelid statistics of the user over time; and
the controller is further configured to process the information about the eyelid statistics for the health-related diagnostic of the user.

6. The headset of claim 1, wherein the transceiver is further configured to communicate, to the intermediate device, the health information data at a first frequency that is less than a second frequency at which a pre-processed portion of the health information data would be communicated.

7. The headset of claim 1, wherein:
the controller is further configured to determine a respective rank for each type of data of the captured health information data; and
the transceiver is further configured to communicate each type of data to the intermediate device in accordance with the respective rank.

8. The headset of claim 1, wherein the processed user's data is used by a healthcare application running on the intermediate device for the health-related diagnostic.

9. The headset of claim 1, wherein the intermediate device communicates the processed user's data to one or more users of the intermediate device for providing information about the health-related diagnostic to the one or more users.

10. The headset of claim 1, wherein the intermediate device further communicates the portion of the processed user's data to one or more application devices for at least one of further processing and utilization.

11. The headset of claim 1, wherein the server platform extracts at least one of statistics and features from the portion of the processed user's data and provides an access to the at least one of extracted statistics and features for at least one of one or more partner services and one or more application devices.

12. A method comprising:
capturing, by a plurality of sensors embedded into a frame of a headset, health information data for a user wearing the headset, the plurality of sensors including an acoustic sensor configured to capture auditory information associated with the user and a plurality of gaze sensors, each of the plurality of gaze sensors comprising:
a light emitter configured to emit tracking light to an eye of the user, and
a detector configured to:
detect a signal of a plurality of signals related to a version of the tracking light reflected from at least one surface of the eye, wherein the plurality of signals detected by the plurality of gaze sensors comprise eye-related data, and
capture an image of the eye based on the version of the tracking light reflected from the at least one surface of the eye;
dynamically adjusting, based on the image of the eye captured by the detector, a focal distance of a focus-tunable lens of a pair of lenses of the headset;
processing, by a controller coupled to the plurality of sensors and using a natural language processing algorithm, the auditory information to classify the user as exhibiting a language disorder;
extracting, by the controller and from the eye-related data, information about dilations of pupils of eyes of the user;
determining, by the controller and based on the extracted information about dilations of pupils, an indication of a possible neurological damage for the user; and
communicating, by a transceiver coupled to the controller to a wireless intermediate device via a wireless connection, user's data including the health information data, an indication of the user exhibiting the language disorder, and the indication of the possible neurological damage for processing the user's data received from the headset at the intermediate device to generate processed user's data for a health-related diagnostic of the user,
wherein the wireless intermediate device communicates, via a second wireless connection, a portion of the user's data and a portion of the processed user's data to a server platform for further processing.

13. The method of claim 12, wherein capturing the health information data comprises:
capturing at least one of data related to a skin of the user, data related to an orientation of a head of the user, data related to a brain activity for the user, data related to a tracked activity of the user, data related to a breathing of the user, and data related to an environment of the headset.

14. The method of claim 12, further comprising:
extracting, by the controller, one or more features related to the user from the captured health information data,
wherein the extracted one or more features comprise at least one of one or more features of at least one eye of the user, and one or more features related to a mouth of the user.

15. The method of claim 14, further comprising:
extracting, by the controller, the one or more features of the at least one eye related to information about eyelid statistics of the user over time; and
processing, by the controller, the information about the eyelid statistics for the health-related diagnostic of the user.

16. The method of claim 12, further comprising:
communicating, by the transceiver to the intermediate device, the health information data at a first frequency that is less than a second frequency at which a pre-processed portion of the health information data would be communicated.

17. The method of claim 12, further comprising:
determining, by the controller, a respective rank for each type of data of the captured health information data; and
communicating, by the transceiver, each type of data to the intermediate device in accordance with the respective rank.

18. The method of claim 12, wherein:
the portion of the processed user's data is further communicated to one or more application devices for at least one of further processing and utilization; and
the server platform extracts at least one of statistics and features from the portion of the processed user's data and provides an access to the at least one of extracted statistics and features for at least one of one or more partner services and the one or more application devices.

19. A system comprising:
a headset including:
   a plurality of sensors embedded into a frame of the headset and configured to capture health information data for a user wearing the headset, the plurality of sensors including an acoustic sensor configured to capture auditory information associated with the user and a plurality of gaze sensors, each of the plurality of gaze sensors comprising:
      a light emitter configured to emit tracking light to an eye of the user, and
      a detector configured to:
         detect a signal of a plurality of signals related to a version of the tracking light reflected from at least one surface of the eye, wherein the plurality of signals detected by the plurality of gaze sensors comprise eye-related data, and
         capture an image of the eye based on the version of the tracking light reflected from the at least one surface of the eye,
   a pair of lenses including a focus-tunable lens capable of having a focal distance dynamically adjusted based on the image of the eye captured by the detector,
   a controller coupled to the plurality of sensors, the controller configured to:
      process, using a natural language processing algorithm, the auditory information to classify the user as exhibiting a language disorder,
      extract, from the eye-related data, information about dilations of pupils of eyes of the user, and
      determine, based on the extracted information about dilations of pupils, an indication of a possible neurological damage for the user, and
   a transceiver coupled to the controller, the transceiver configured to communicate user's data including the health information data, an indication of the user exhibiting the language disorder, and the indication of the possible neurological damage outside of the headset; and
a wireless intermediate device communicatively coupled to the headset via a wireless connection, the wireless intermediate device including:
   a second transceiver configured to receive the user's data via the wireless connection, and
   a second controller configured to process the received user's data to generate processed user's data for a health-related diagnostic of the user,
   wherein the second transceiver is further configured to communicate, via a second wireless connection, a portion of the user's data and a portion of the processed user's data to a server platform for further processing.

20. The system of claim 19, wherein:
the controller is further configured to extract one or more features related to the user from the captured health information data;
the extracted one or more features comprise at least one of: one or more features of at least one eye of the user, and one or more features related to a mouth of the user; and
the one or more features of the at least one eye comprise information about eyelid statistics of the user over time.

* * * * *